United States Patent
Kurata et al.

(10) Patent No.: US 6,642,941 B1
(45) Date of Patent: Nov. 4, 2003

(54) DISPLAYING OPTIMUM SCREENS ON VARIOUS TYPES OF OUTPUT TERMINALS USING A COMMON APPLICATION

(75) Inventors: Tsukasa Kurata, Kawasaki (JP); Tatsuhiro Hirosaki, Ishikawa (JP); Kouichi Yamashita, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/440,705

(22) Filed: Nov. 16, 1999

(30) Foreign Application Priority Data

Nov. 17, 1998 (JP) .......................................... 10-327198

(51) Int. Cl.⁷ .......................... G06F 3/00; G06F 15/177
(52) U.S. Cl. ....................... 345/733; 345/744; 345/762; 345/760; 709/328; 709/203
(58) Field of Search ................................. 345/733, 762, 345/744, 746, 747, 745, 764, 778, 730, 731, 760, 765; 709/328, 203, 201; 707/513, 514, 515, 517; 715/513–515, 517

(56) References Cited

U.S. PATENT DOCUMENTS

| | | | | | |
|---|---|---|---|---|---|
| 5,179,700 A | * | 1/1993 | Aihara et al. | ............ | 345/744 X |
| 5,815,148 A | * | 9/1998 | Tanaka | .................... | 345/746 X |
| 5,983,227 A | * | 11/1999 | Nazem et al. | .......... | 707/513 X |
| 6,151,596 A | * | 11/2000 | Hosomi | ................... | 707/513 X |
| 6,300,947 B1 | * | 10/2001 | Kanevsky | ............... | 707/513 X |
| 6,362,836 B1 | * | 3/2002 | Shaw et al. | .................. | 345/744 |

FOREIGN PATENT DOCUMENTS

| | | |
|---|---|---|
| JP | 62-100854 | 5/1987 |
| JP | 09-259083 | 10/1997 |

* cited by examiner

*Primary Examiner*—Raymond J. Bayerl
(74) *Attorney, Agent, or Firm*—Staas & Halsey LLP

(57) ABSTRACT

An information processing method, a storage medium storing program code readable by a computer, and an information processing device carry out a plurality of application programs that are connected to a plurality of output terminals. When an output terminal and output information is specified, identification information corresponding to the output information is defined. At least one display format, with identification information, is prepared for each type of the output terminals and each screen to be displayed. A display format is chosen and the output information is inserted into the selected display format according to the identification information. The selected display format and the output information are sent to the specified output terminal. The method, the storage medium, which has program code stored thereon, and the information processing device prepare display formats for each type of output terminal and each screen to be displayed to facilitate program development.

10 Claims, 12 Drawing Sheets

FIG. 4A

| RECORD NAME | RECORD DATA | RECORD DATA ATTRIBUTE |
|---|---|---|
| RECORD001 | 1998/12/31 | POSITION=C |
| RECORD002 | admin | |
| RECORD003 | password | TYPE=PASSWD |
| RECORD004 | http//www.xxxx.fujitsu.co.jp/image.gif | |
| RECORD005 | AAA | |
| RECORD006 | BBB | |

DATASHEET — 41, 42, 43

FIG. 4B

DESIGN FORM

| RECORD NAME |
|---|
| RECORD001 |
| RECORD002 |
| RECORD003 |
| RECORD004 |

51

F I G. 5

```
<html>
<head>
<title> LOGIN SCREEN </title>
</head>
<body bgcolor:"#FFFFFF">
<p><img src="$(RECORD004)$" width="300" height="140"></p>              61

<p>$(RECORD001)$</p>   62

<p> USER ID:<input type="text" size="20" name="T1"      } 63
value="$(RECORD002)$"></p>

<p> PASSWORD : <input type="password" size="20" name="T1" } 64
value="$(RECORD003)$"></p>

<form method="POST">
    <p><input type="button" name"B1" value="SUBMIT"><input
    type="reset" name="B2" value="CANCEL"></p>
</form>
</body>
<html>
```

FIG.6

```
<html>

<head>
<title> LOGIN SCREEN </title>
</head>

<body bgcolor="#FFFFFF">

<p><img src="http://www.xxxx.fujitsu.co.jp/image.gif"  ←— 61
width="300" height="140"></p>

<p><center>1998/12/31</center></p>   ←——— 62

<p> USER ID:<input type="text" size="20" name="T1" value="admin"></p>
                                                              ↖— 63
<p>PASSWORD <input type="password" size="20" name="T1"
       value="password"></p>                              }— 64

<form method="POST">
    <p><input type="button" name="B1" value="SUBMIT"><input type="reset"
    name="B2" value="CANCEL"></p>
</form>
</body>
</html>
```

FIG. 12

| SPECIFIC CHARACTER STRING | DESIGN FORM MAME |
|---|---|
| SYSTEM READY | A |
| SYSTEM START | B |
| SYSTEM STOP | C |
| ⋮ | ⋮ |

81, 82, 83

DISPLAYING OPTIMUM SCREENS ON VARIOUS TYPES OF OUTPUT TERMINALS USING A COMMON APPLICATION

The present application is based on Japanese priority application No. 10-327198 filed on Nov. 17, 1998, the entire contents of which are hereby incorporated by reference.

BACKGROUND OF THE INVENTION

1. Field of the Invention

The present invention generally relates to an information processing method, an information processing device and a program storage medium, and particularly relates to an information processing method, an information processing device and a program storage medium for displaying optimum screens on various types of output terminals using a common application.

2. Description of the Related Art

A client/server system includes a server and various client terminals connected to a server. The client/server system may also include a host computer connected to the server. The server and/or the host computer are/is provided with application programs, which can be commonly accessed by the client terminals having different display configurations.

In the related art, in order to display optimum screens on the client terminals, the application programs are programmed so as to be adapted to respective ones of the client terminals to be connected to the server. For example, the application programs are programmed using window sizes and window formats corresponding to screen resolutions of the client terminals to be connected.

Thus, when a client terminal with a new display configuration is connected to the server, the application programs should be rewritten. For example, if the newly connected client terminal conforms with the HTML, the program should be rewritten in conformity with the HTML.

However, it is often the case that, after the application programs have been developed, staff involved in a program development project move out from that project. This causes a problem that a rewriting of the application programs becomes difficult. That is to say, when a client terminal with a new display configuration is connected to the server, the application programs must be programmed from the very beginning.

SUMMARY OF THE INVENTION

Accordingly, it is a general object of the present invention to provide an information processing method, an information processing device and a program storage medium which can reduce the above drawbacks.

It is another and more specific object of the present invention to provide an information processing method, an information processing device and a program storage medium which can easily alter a system configuration.

In order to achieve the above object, an information processing method to be carried out on an information processing device provided with a plurality of application programs and whereto a plurality of output terminals are connected of the present invention includes the steps of:

a) specifying an output terminal from the output terminals;

b) defining output information to be output at the specified output terminal and identification information corresponding to the output information;

c) preparing at least one display format for each type of the output terminals and each screen to be displayed on the output terminals, the display format including the identification information;

d) selecting a display format based on the specified output terminal and the identification information;

e) inserting the output information into the selected display format according to the identification information; and f) sending the selected display format provided with the output information to the specified output terminal.

The above object is also achieve by an information processing method to be carried out on an information processing device provided with a plurality of application programs and whereto a plurality of client terminals are connected, the method including the steps of:

a) defining an output format for each type of the client terminals;

b) selecting an output format defined for a specified client terminal; and c) sending information to be output to the specified client terminal based on the selected output format.

According to the above inventions, there is no need to reprogram the application programs when a further terminal of a different type is connected to the information processing device.

According to the present invention, there is also provided a program storage medium storing program code readable by a computer, the program code tangibly embodying a program of instructions executable by the computer to perform the information processing methods described above.

Further, according to the present invention, there is also provided an information processing device which can implement the above-described methods.

Other objects and further features of the present invention will be apparent from the following detailed description when read in conjunction with the accompanying drawings.

BRIEF DESCRIPTION OF THE DRAWINGS

FIGS. 4A and 4B are diagrams showing an example of a data organization of a datasheet and a design form according to the present invention, respectively.

FIG. 5 is a diagram showing an example of a style template according to the present invention.

FIG. 6 is a diagram showing an example of a data organization of output information of the embodiment of the present invention.

FIG. 12 is a diagram showing an example of a data organization of a design form name table according to the present invention.

DETAILED DESCRIPTION OF THE PREFERRED EMBODIMENTS

In the following, principles and embodiments of the present invention will be described with reference to the accompanying drawings.

Figure 1:
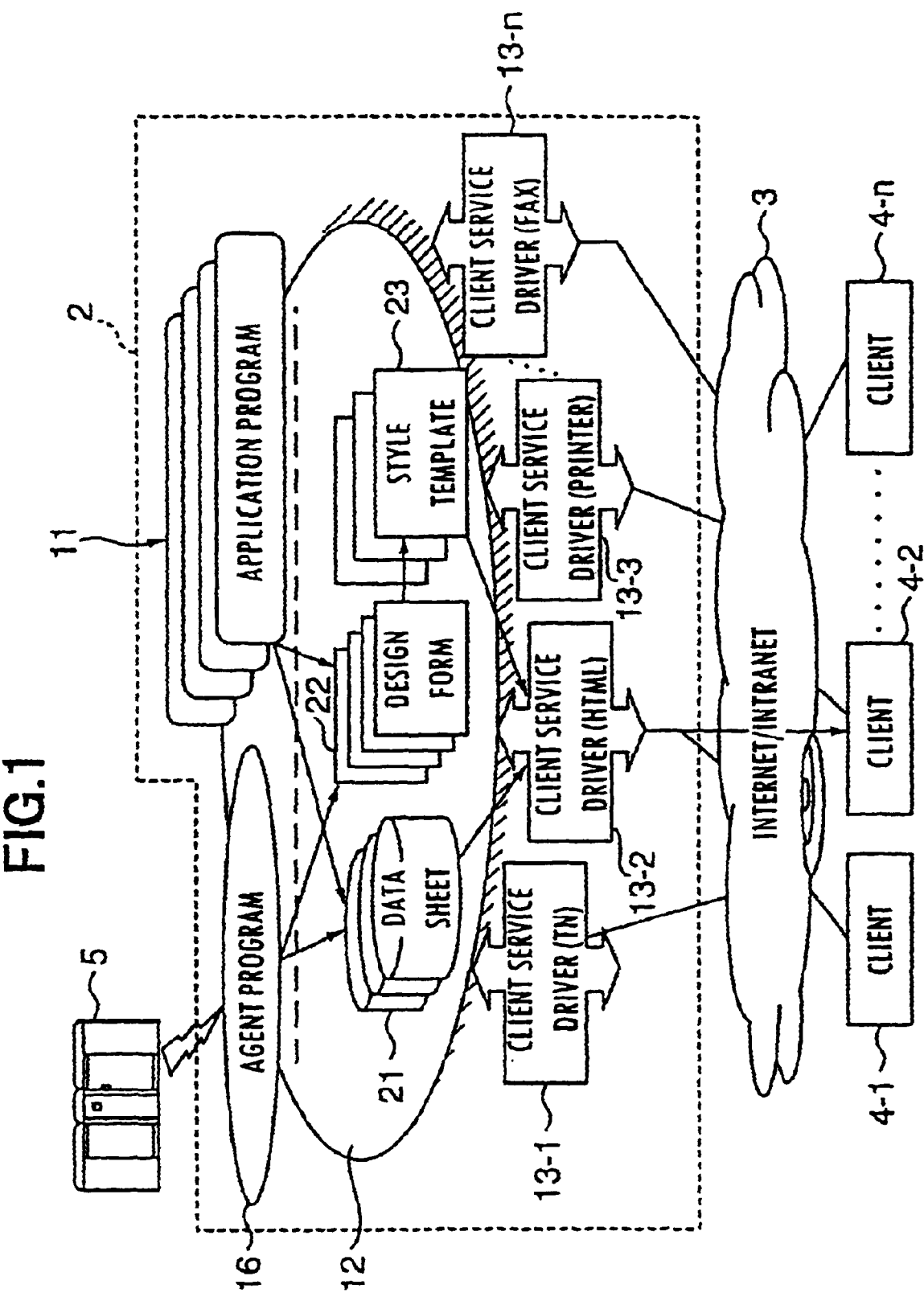
FIG. 1 is a block diagram showing a client/server system of an embodiment of the present invention.

FIG. 1 is a block diagram showing a client/server system of an embodiment of the present invention.

The client/server system 1 of the present embodiment includes a server terminal (hereinafter referred to as a server) 2 and client terminals or output terminals (hereinafter referred to as clients) 4-1 to 4-n connected to the server 2 via a network 3. The server 2 is provided with at least one application program 11 operating thereon. Also, the server 2 is connected to a host computer 5, so that the at least one application program can be controlled according to commands supplied from the host computer 5. The host computer 5 is provided together with an agent program 16.

The hardware structure of the server 2 is similar to that of known computer devices. Though not shown in the Figure, the server 2 includes a CPU, a memory, a hard disk, portable medium drives such as a CD-ROM drive and a floppy-disk drive, and a network board. Also, in order to implement functions according to the present embodiment via portable media and via the network, appropriate programs are installed and operated in the hard disk.

The server 2 includes the at least one application program 11, a virtual terminal object interface 12, and client service drivers 13-1 to 13-n. The application program 11 supplies a datasheet name and a design form name to the virtual terminal object interface 12. Note that, when a client is to be specified by the application program 11, an output terminal name is also supplied.

Then, the virtual terminal object interface 12 selects a datasheet 21 from the datasheet name and a design form 22 from the design form name. Also, the virtual terminal object interface 12 selects a style template 23 from the selected design form 22 and the output terminal name.

In the client service drivers 13-1 to 13-n, record contents stored in the datasheet 21 are merged into the style template 23 selected at the virtual terminal object interface 12. The merged data is output to the clients 4-1 to 4-n via the network 3.

Other elements indicated in FIG. 1 will be described in the following description where necessary.

Figure 2:
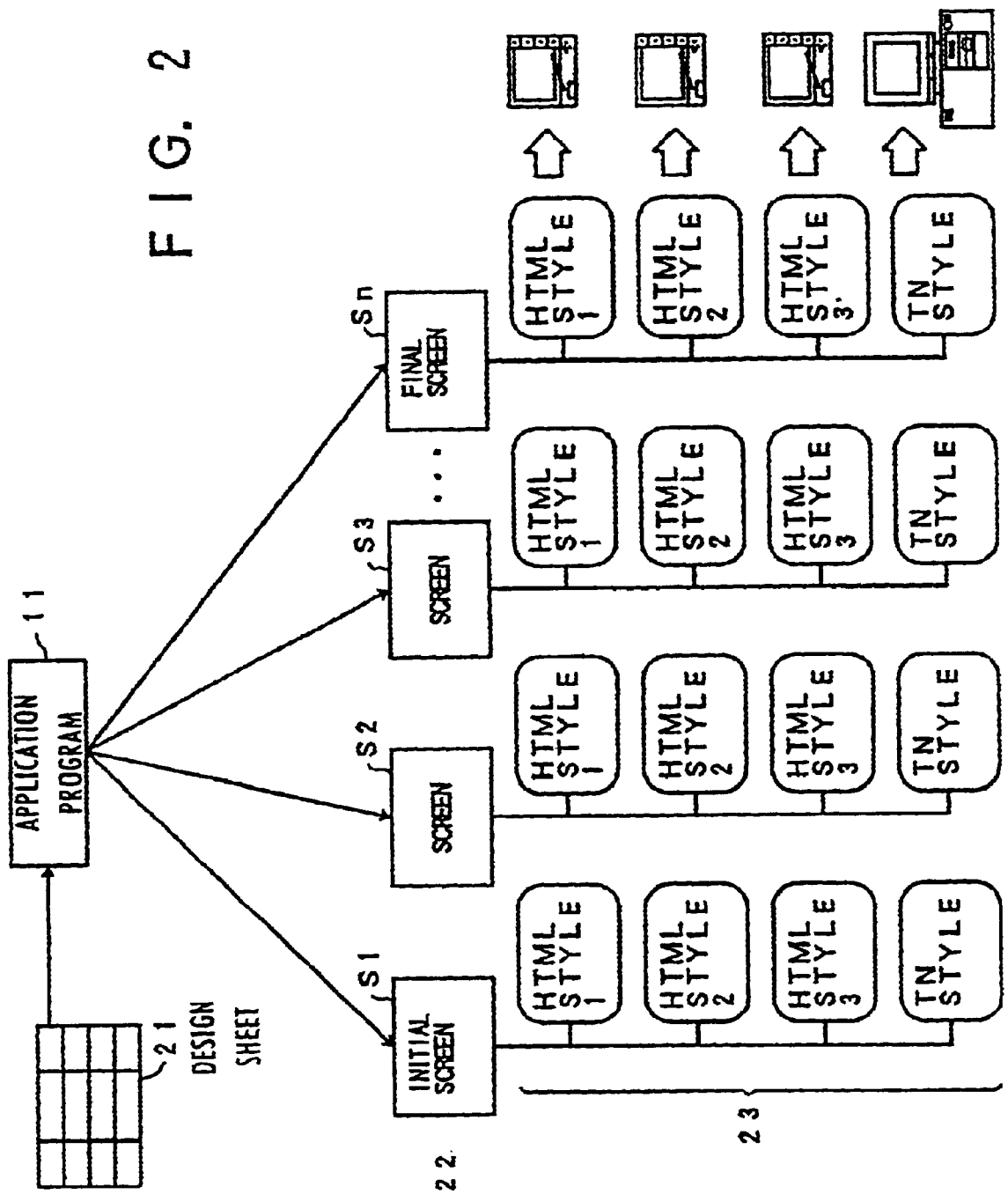
FIG. 2 is a diagram showing a data structure used in the embodiment of the present invention.

FIG. 2 is a diagram showing a data structure used in the embodiment of the present invention.

The datasheet 21 is provided for a respective application program 11. The application program 11 supplies a datasheet name of the presently running application program 11 to the virtual terminal object interface 12. Then, the virtual terminal object interface 12 selects the datasheet 21 corresponding to the relevant application program 11 from this datasheet name. As will be described later, the datasheet 21 stores record contents and record attributes for each record name (see FIG. 4A). The record contents and record attributes are used when displaying a screen in the application program 11.

The design form 22 is assigned for each one of the screens S1 to Sn to be displayed by the application program 11. As will be described later, record names "RECORD00X" used for each one of the screens S1 to Sn are described in each design form 22 (see FIG. 4B).

The style template 23 is defined for each screen and each type of client. The style template 23 is selected according to a specified client and a screen to be displayed. Also, the style template 23 is provided with record names "$(RECORD00X)$" corresponding to record contents to be displayed.

In the following, the file organization used in the virtual terminal object interface will be described.

Figure 3:
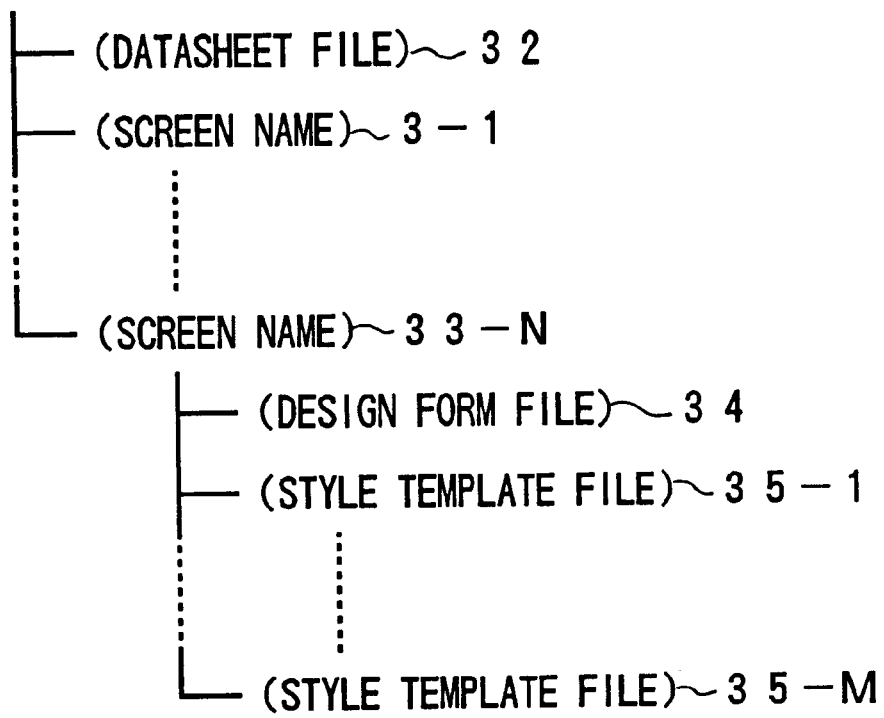
FIG. 3 is a diagram showing a file management structure of a virtual terminal object interface according to the present invention.

FIG. 3 is a diagram showing a file management structure of the virtual terminal object interface 12 according to the present invention. A datasheet name 31 is provided as an upper directory. A datasheet file 32 and screen names 33-1 to 33-N are provided under the directory of the datasheet name 31. The datasheet file 32 includes datasheet information corresponding to the screen names 33-1 to 33-N. The screen names 33-1 to 33-N are also directories, each provided with a design form file 34 and style template files 35-1 to 35-M.

The design form file 34 includes design form information (to be described later) of the screen 33-N. Also, the style template files 35-1 to 35-N include the style template 23 for each terminal (to be described later). The above-described datasheet file 32 and the design form file 34 are created under predetermined file names.

FIGS. 4A and 4B are diagrams showing an example of a data organization of a datasheet and a design form according to the present invention, respectively.

As shown in FIG. 4A, the datasheet information described in the datasheet file 32 includes record names 41, record data 42 and record data attributes 43. For example, for record name "RECORD001", data of the date "1998/12/31" is described as the record data 42. Also, for the same record name "RECORD001", a data attribute "POSITION=C", defining that the record data 42 is to be positioned at the center of the screen, is described as the record data attribute 43.

Also, for record name "RECORD002", data "admin" is described as the record data 42.

Further, for record name "RECORD003", a password "password" is described as the record data 42. Also, for the same record name "RECORD003", a data attribute "TYPE=PASSWD", defining that the password is to be displayed as "*"s, is described as the record data attribute 43.

Also, for record name "RECORD004", an address of screen data "<nttp//www.xxxx.fujitsu.co.jp/image.gif>" is described as the record data 42.

Similarly, for record name "RECORD005", data "AAA" is described as the record data 42 and for record name "RECORD006", data "BBB" is described as the record data 42.

Note that the record attribute 43 may include other attributes, such as "KIND" indicating record type, "NAME" indicating record name for identifying the record data, "LENGTH" indicating record data length, "HIGHLIGHT" specifying a degree of highlight of the record data as a numerical value, "SIZE" specifying a displaying size as a numerical value, "WRTBYAPL" specifying an attribute of data rewriting by the application and "WRTBYDEV" specifying an attribute of data rewriting by the device.

Also, the design form file 34 includes record names 51 used for displaying a selected screen. For example, with the design form shown in FIG. 4B, the record data with record names "RECORD001", "RECORD002", "RECORD003" and "RECORD004" are used for displaying the screen.

FIG. 5 is a diagram showing an example of a style template according to the present invention.

The style template files 35-1 to 35-M may be of HTML format as shown in FIG. 5 and may include display commands 61 to 64.

The display command 61 indicates that an image stored at an address specified by the record name "RECORD004" is displayed in an area with a width of 300 dots and a height of 140 dots.

The display command 62 indicates that a content described in record name "RECORD001" is displayed.

The display command 63 indicates that after displaying "USER ID", a data content of record name "RECORD002" is displayed with a display size "20" in a text format.

The display command 64 indicates that after displaying "PASSWORD", a data content of record name "RECORD003" is displayed with a display size "20" in a password format (i.e., "*"s).

At the locations corresponding to the record names "RECORD001", "RECORD002", "RECORD003" and "RECORD004", the record data of the corresponding record name in the datasheet shown in FIG. 4A is inserted according to the corresponding record data attribute.

At the location corresponding to the record name "$(RECORD004)$" of the display command 61, the record data "<http//www.xxxx.fujitsu.co.jp/image.gif>" of the record name "RECORD004" of the datasheet shown in FIG. 4A is merged.

The record data "1998/12/31" and the record attribute "POSITION=C" corresponding to the record name "RECORD001" of the datasheet shown in FIG. 4A are read out. The record data "1998/12/31" and the record attribute "POSITION=C" are merged into the location corresponding to the record name "$(RECORD001)$" of the display command 62 so as to provide the description "<center>1998/12/31</center>".

At the location corresponding to the record name "$(RECORD002)$" of the display command 63, the data "admin" of the record name "RECORD002" of the datasheet shown in FIG. 4A is merged.

At the location corresponding to the record name "$(RECORD003)$" of the display command 64, the record data "password, TYPE=PASSWD" of the record name "RECORD002" of the datasheet shown in FIG. 4A is merged. The data attribute "TYPE=PASSWD" indicates that the record data is a password.

FIG. 6 is a diagram showing an example of a data organization of output information of the embodiment of the present invention.

As shown in FIG. 6, the output information is provided such that the record data "<center>1998/12/31</center>", "admin", "password" and "<http//www.xxxx.fujitsu.co.jp/image.gif>" are merged at positions corresponding to the record names "RECORD001", "RECORD002", "RECORD003" and "RECORD004".

Figure 7:
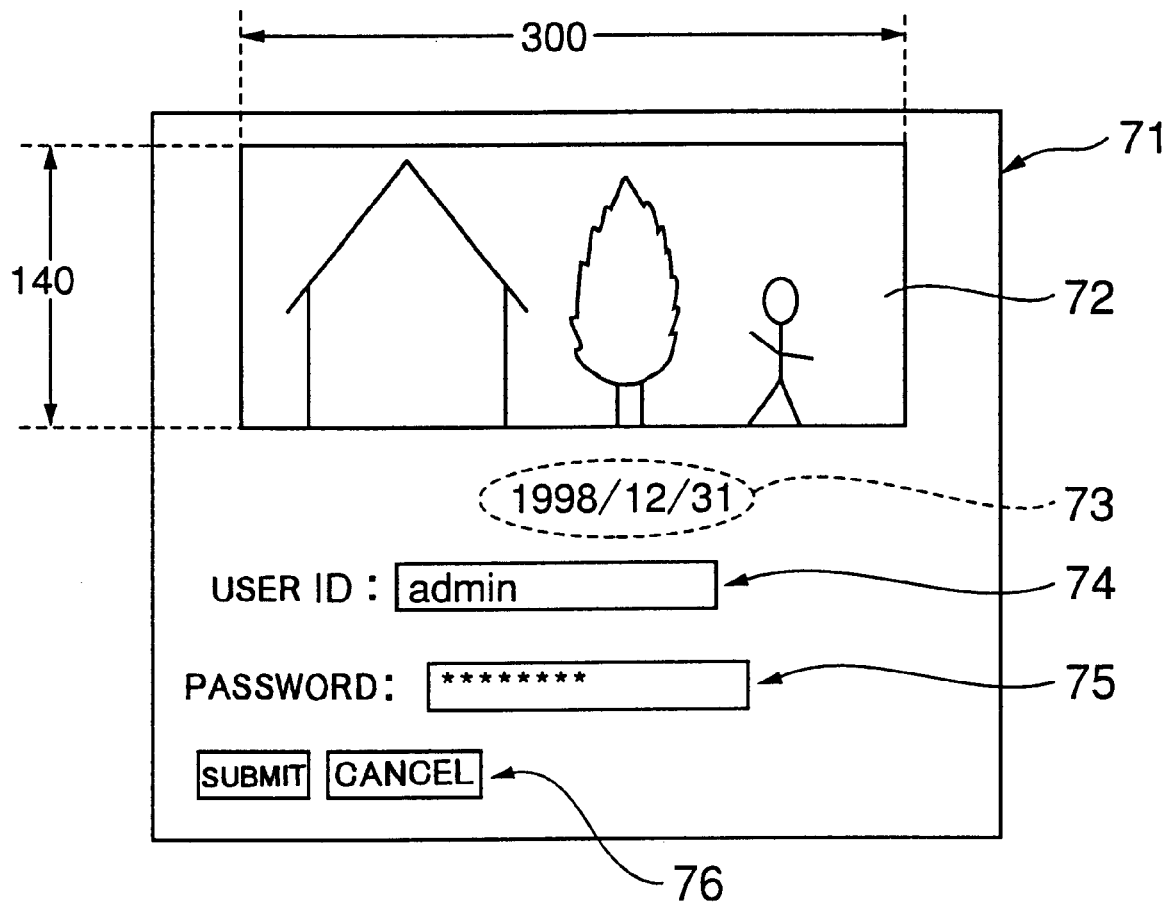
FIG. 7 is a diagram showing an example of a display screen displayed using the style template of the embodiment of the present invention.

FIG. 7 is a diagram showing an example of a display screen displayed using the style template of the embodiment of the present invention.

According to FIG. 6, an image 72 specified by the address "<http//www.xxxx.fujitsu.co.jp/image.gif>" is displayed in the area with the width of 300 dots and the height of 140 dots on a display screen 71 as shown in FIG. 7.

Also, the data "1998/12/31" is displayed at the central part 73 of the display screen 71. Further, in a user ID display area 74, "admin" is displayed which is described in the record data as a user ID.

In the password display area 75, "password" described in the record data is displayed as a password in the "*********" format.

In the following, processes carried out by the application program 11, the virtual terminal object interface 12, the client service drivers 13-1 to 13-n and the clients 4-1 to 4-n will be described with reference to the drawings.

Figure 8:
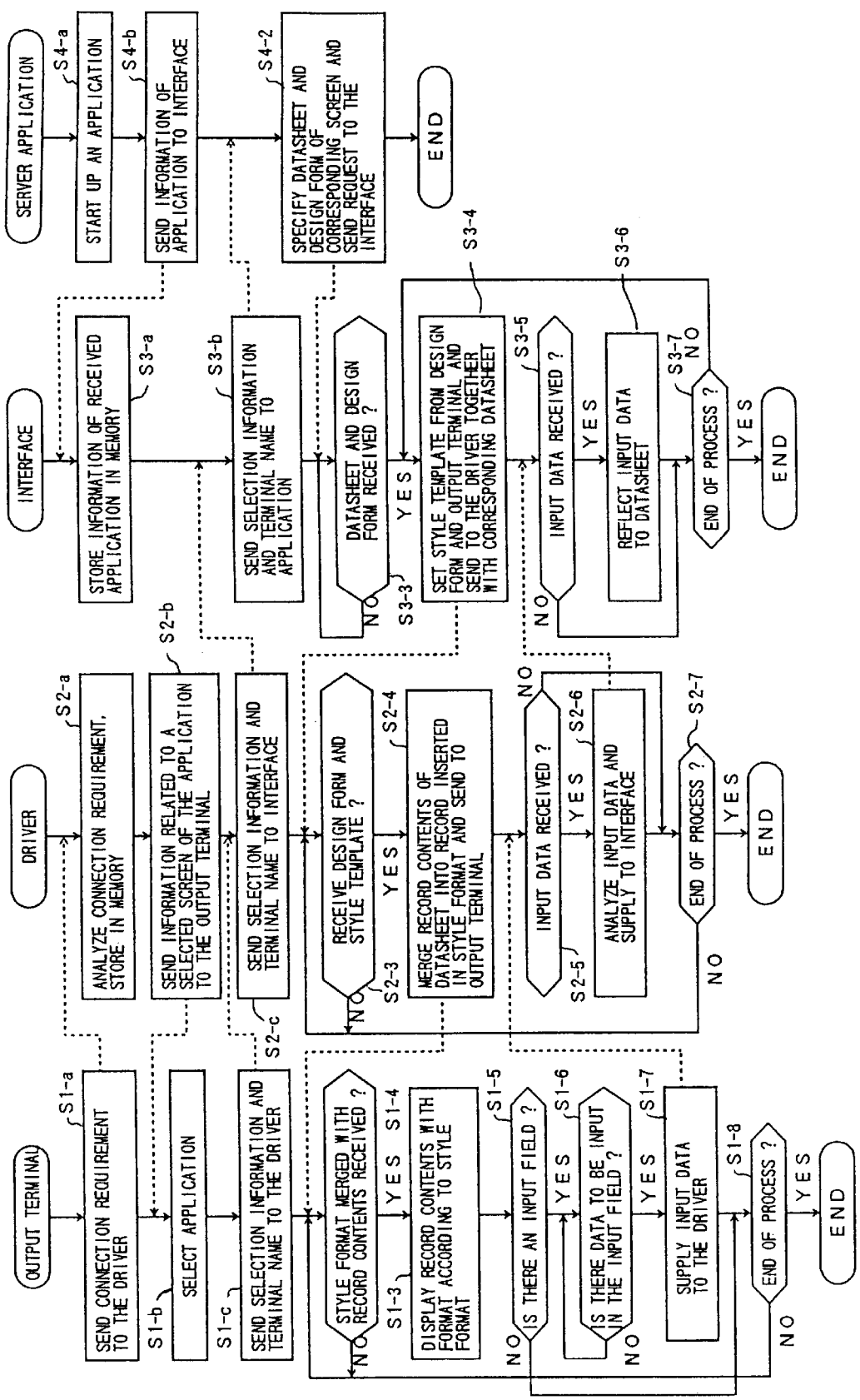
FIG. 8 is a flow chart showing processes carried out according to the present invention.

FIG. 8 is a flow chart showing processes carried out according to the present invention.

In order to respond to a request from the clients 4-1 to 4-n (the output terminals), the server application 11 (application program) is started up and brought to a standby state.

First, the application program 11 is started up (step S4-a). The application program 11 sends information (application information) to the virtual terminal object interface 12 announcing that the application program 11 has been started up (step S4-b).

The virtual terminal object interface 12 receives the application information from the application program 11, and stores the application information in a memory as information for application management (step S3-a).

Using this application information, it is possible to identify which application program 11 is presently started up.

When a requirement for a connection to the server 2 is made by a user of a client 4-n, for example, the client 4-n sends a connection requirement to the server 2 via the network 3 (step S1-a).

At the server 2, the connection requirement from the client 4-n is first sent to the driver 13-n. The driver 13-n then analyzes the requirement and stores the result of the analysis in a memory at locations assigned for the driver 13-n (step S2-a).

The requirement supplied from the client 4-n to the driver 13-n includes information specifying the relevant client 4-n.

For example, when the client 4-n is a browser, the connection requirement is made by the http (Hyper Text Transfer Protocol). The protocol includes unique information for specifying a browser to the agent program. This information is used as information for specifying the client 4-n. This is also the case when the client 4-n is a host emulator. That is to say, information specifying the client 4-n is included in a communication protocol.

After the analysis, the driver 13-n refers to the stored application information via the virtual terminal object interface 12. Then, the driver 13-n sends information concerning a screen for selecting a presently operating application program 11 to the client 4-n (step S2-b).

The client 4-n displays the screen for selecting the presently operating application program 11 using the information received from the driver 13-n. When the application program 11 is selected by the user (step S1-b), information representing which application program 11 (hereinafter referred to as selection information) has been selected and specific information of the client (hereinafter referred to as a terminal name) are sent to the driver 13-n (step S1-c).

The driver 13-n sends the selection information and the terminal name, both received from the client 4-n, to the virtual terminal object interface 12 (step S2-c). Also, the virtual terminal object interface 12 sends the selection information and the terminal name, both received from the driver 13-n, to the application program 11 (step S3-b).

Upon reception of the selection information and the terminal name, both received from the virtual terminal object interface 12, the application program 11 specifies the datasheet name and the design form name of the initial screen and sends a request to the virtual terminal object interface 12 (step S4-2).

When the datasheet name and the design form name of the initial screen are specified from the application program 11 (step S3-3), the datasheet file 32 of the directory having the corresponding datasheet name is chosen as shown in FIG. 3. Also, according to the design form name, a design form (design form file 34) having the design form name (identical to the name of the screen) under the directory of the specified datasheet is specified. Further, the style template (style template file) of the directory of the specified design form name based on the terminal name is specified. Finally, the datasheet, the design form and the style template are supplied to the driver 13-n (step S34, S2-3).

It is to be noted that the file management structure shown in FIG. 3 is provided in order that the directories and the files are uniquely determined from the datasheet name, the design form name, and the terminal name.

At the driver 13-n, the record contents are merged into the style template provided from the virtual terminal object interface 12 at positions corresponding to the respective record names. Then the thus-obtained information is sent to the client 4-n via the network 3 (step S2-4). For example, first, the record contents and the record attributes corresponding to "$(RECORD001)$", "$(RECORD002)$", "$(RECORD003)$" and "$(RECORD004)$" are read out from the datasheet. Then, the record contents are inserted at positions corresponding to the record names "$(RECORD001)$", "$(RECORD002)$", "$(RECORD003)$" and "$(RECORD004)$" in accordance with the record attributes. Then input data is sent to the client 4-n via the network 3 and received by the client 4-n (step S1-3). The client 4-n displays a screen corresponding to the style format provided by the driver 13-n (step S1-4). When the user inputs data into an input field of the screen (steps S1-5, S1-6), the client 4-n sends the input data to the driver 13-n via the network 3 (step S1-7).

The driver 13-n receives the data from the client 4-n (step 2-5) and then analyzes the input data. Then, this data is supplied to the virtual terminal object interface 12 (step S2-6).

The virtual terminal object interface 12 receives the input data from the driver 13-n (step S3-5). Then, the input data is reflected in the datasheet (step S3-6).

The client 4-n, the driver 13-n and the virtual terminal object interface 12 will transmit the input data to the datasheet until there is a process end command or a request from the application program 11 (S1-8, S2-7, S3-7).

Figure 9:
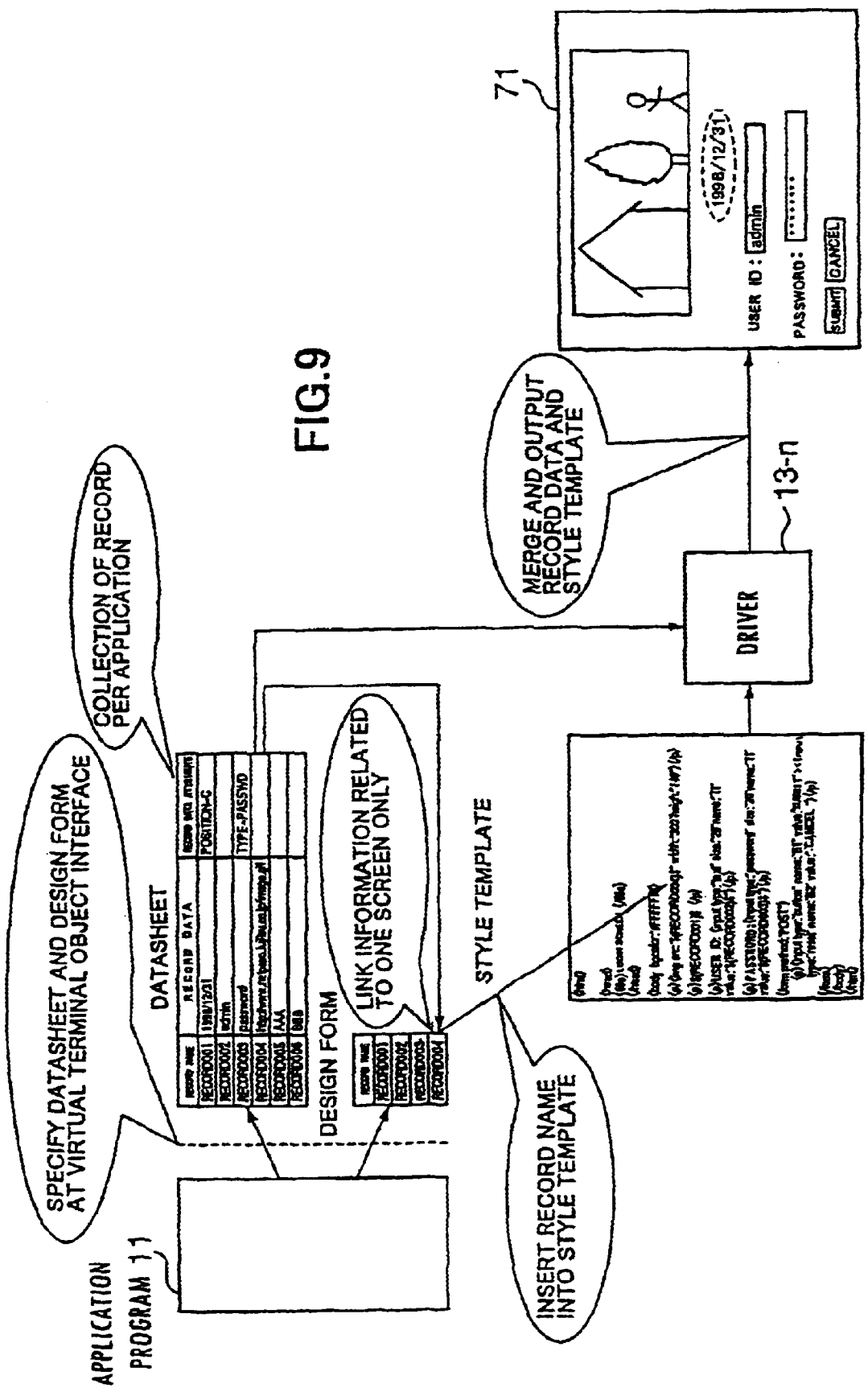
FIG. 9 is an operational diagram showing an operation of an embodiment of the present embodiment.

FIG. 9 is an operational diagram showing an operation of an embodiment of the present embodiment.

In the present embodiment, the application program 11 specifies a datasheet name representing the application and a design form name representing the screen. The virtual terminal object interface 12 selects the corresponding datasheet and the design form from the datasheet name and the design form name specified in the application program 11. Also, the virtual terminal object interface 12 obtains the style template adapted to the output terminal and corresponding to the screen according to the output terminal name and the design form specified by the application program 11. The virtual terminal object interface 12 supplies the obtained style template to the driver 13-n.

The driver 13-n merges the record contents of the datasheet to the obtained style template. That is to say, the record contents and the record attributes corresponding to the record name inserted in the obtained style template is read out from the datasheet. Then, the record contents and the record attributes are inserted in the style template instead of the record names.

The driver 13-n provides the style template with the record contents to the client 4-n. The client 4-n displays the screen according to the record contents.

In the above description, the datasheet name and the design form name are specified from the application program 11 to the virtual terminal object interface 12 in response to a request from the clients 4-1 to 4-n. However, it is also possible to specify the datasheet name and the design form name from the host computer 5 to the virtual terminal object interface 12 by the agent program 16.

Figure 10:
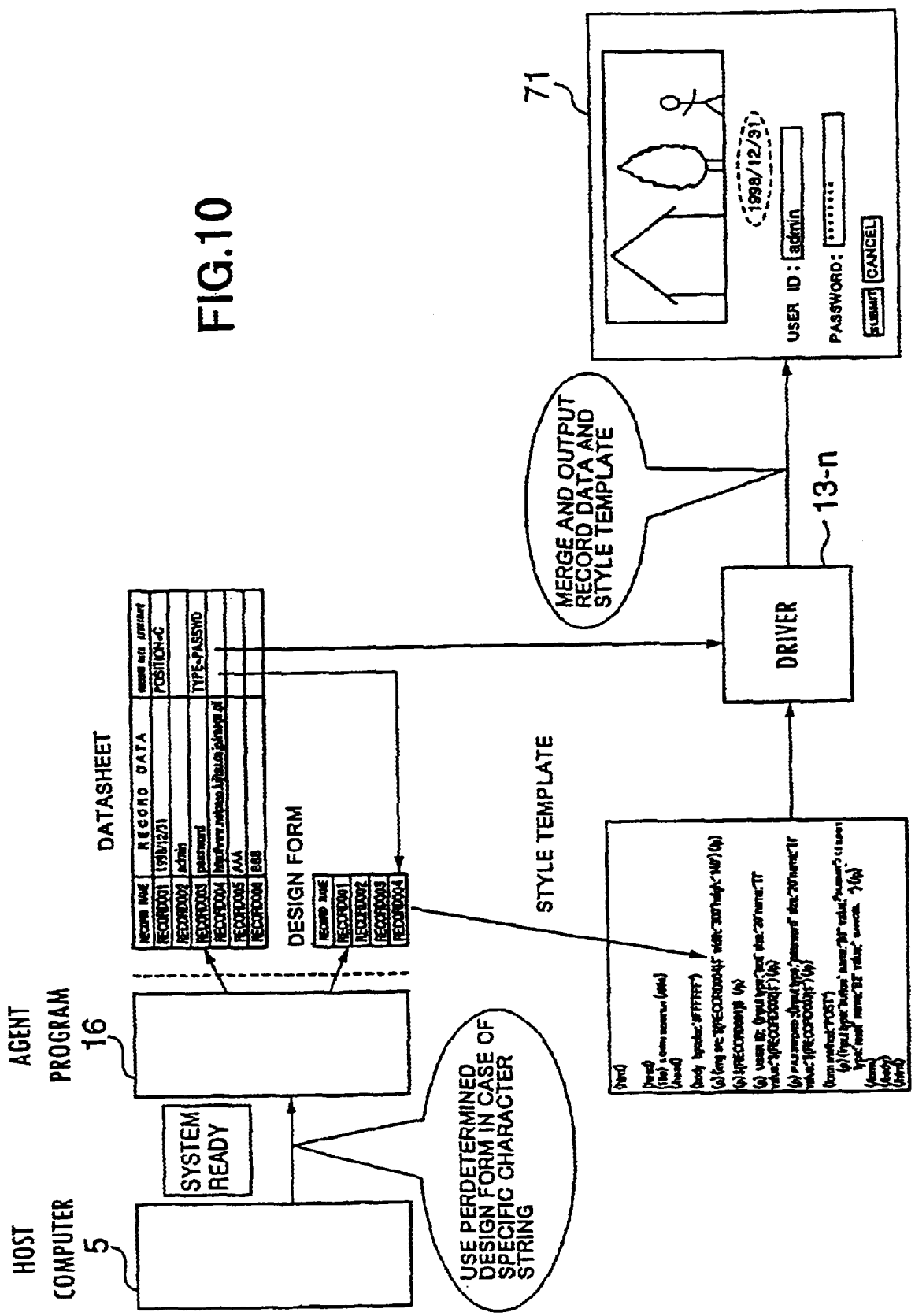
FIG. 10 is an operational diagram showing an operation of a host computer of an embodiment of the present embodiment.

FIG. 10 is an operational diagram showing an operation of a host computer of an embodiment of the present embodiment.

When the datasheet name and the design form name are specified from the host computer 5 to the virtual terminal object interface 12, the agent program 16 is used for sharing the virtual terminal object interface 12 between the host computer 5 and the application program 11 of the server 2.

The agent program 16 analyzes a character string sent from the host computer 5 and specifies the design form name corresponding to the character string. The datasheet name is, for example, specified such that a design sheet defined for the virtual terminal object interface 12 is exclusively selected for the agent program 16.

The datasheet name and the design form name specified by the agent program 16 are provided to the virtual terminal object interface 12. When the datasheet name and the design form name are specified by the agent program 16, the design sheet 21, the design form 22, the style template 23 and the output terminal name can be obtained. Then, according to the design sheet 21, the design form 22, the style template 23 and the output terminal name, the processes of the steps S3-3 to S3-7 for the virtual terminal object interface 12, the steps S2-3 to S2-7 for the driver 13-n, and the steps S1-3 to S1-8 for the client are carried out as shown in FIG. 8. Thus, the screen 71 is displayed on the client 4-n.

In the following, the processes of the agent program 16 will be described in detail.

Figure 11:
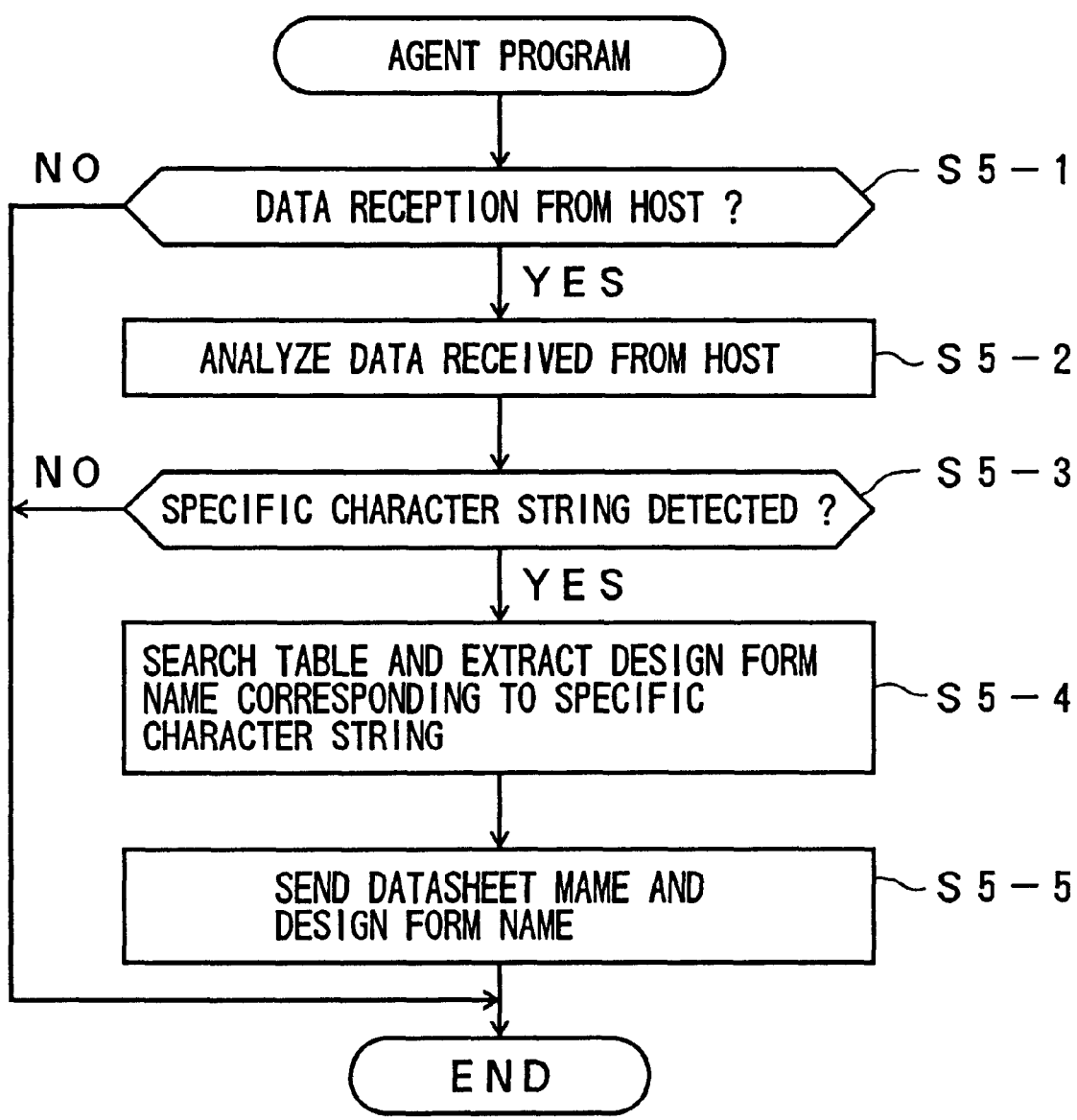
FIG. 11 is a flow chart showing processes carried out by an agent program according to the present invention.

FIG. 11 is a flow chart showing processes carried out by an agent program according to the present invention.

The agent program 16 receives data from the host computer 5 (step S5-1), analyzes the data from the host computer 5 (step S5-2) and determines whether the data is a predetermined specific character string (step S5-3).

If the data is determined as the specific character string in step S5-3, then a design form table is searched for and the design form name corresponding to the specific character string is extracted (step S5-4).

FIG. 12 is a diagram showing an example of a data organization of a design form name table according to the present invention.

The design form name table 81 includes specific character strings 82 such as "SYSTEM READY", "SYSTEM START" and "SYSTEM STOP" and design form names such as "A", "B" and "C" corresponding thereto. For example, when the specific character string "SYSTEM READY" is provided from the host computer 5, the design form name "A" is extracted. When the specific character string "SYSTEM START" is provided from the host computer 5, the design form name "B" is extracted. Further, when the specific character string "SYSTEM STOP" is provided from the host computer 5, the design form name "C" is extracted.

The design form name extracted from the design form name table 81 in step S5-4 of FIG. 11 is provided to the virtual terminal object interface 12 together with the predetermined datasheet name corresponding to the agent program 16 (step S5-5).

As has been described above, according to the present embodiment provided with the agent program 16, the screen can be displayed from the host computer 5 in a similar manner implemented by the application program 11 provided on the server 2.

According to the present embodiment, an output terminal, the data sheet and the design form are specified. The datasheet includes information such as the record contents to be displayed at the output terminal. The design form includes the record names used for the screen to be displayed. The style template corresponding to the screen is selected based on the output terminal and the design form. The record contents described in the datasheet are merged with the selected style template so as to obtain the information to be output at the output terminal. Thus, by defining a plurality of application programs, output terminals, and style templates corresponding to the screen, various types of output terminals can be used and various screens can be displayed from a plurality of application programs using common datasheet name, design form name and output terminal name.

Also, when the number of output terminals and output screens are increased, it is sufficient to specify a corresponding style template. In other words, there is no need to rewrite the application program 11.

Further, according to the present embodiment, by recognizing the output terminal upon an access from the output terminal, it is not necessary to specify the output terminal upon displaying the screen.

Also, according to the present embodiment, the command information can be set by inputting specific character strings from an external environment, so that there is no need for any specific command.

Further, the present invention is not limited to these embodiments, but variations and modifications may be made without departing from the scope of the present invention.

What is claimed is:

1. An information processing method to be carried out on an information processing device provided with a plurality of application programs and whereto a plurality of output terminals are connected, said method comprising the steps of:
   a) specifying an output terminal from said output terminals;
   b) defining output information to be output at said specified output terminal and identification information corresponding to said output information;
   c) preparing at least one display format for each type of said output terminals and each screen to be displayed on said output terminals, said display format including said identification information;
   d) selecting a display format based on said specified output terminal and said identification information;
   e) inserting said output information into said selected display format according to said identification information; and
   f) sending said selected display format provided with said output information to said specified output terminal.

2. The information processing method as claimed in claim 1, wherein said step a) is implemented by recognizing said output terminal in response to an access from said output terminal.

3. The information processing method as claimed in claim 1, wherein, in said step b), said identification information is defined according to a character string supplied from an external environment.

4. A program storage medium storing program code readable by a computer, said program code tangibly embodying a program of instructions executable by the computer to perform an information processing method to be carried out on an information processing device provided with a plurality of application programs and whereto a plurality of output terminals are connected, said method comprising the steps of:
   a) specifying an output terminal from said output terminals,
   b) defining output information to be output at said specified output terminal and identification information corresponding to said output information;
   c) preparing at least one display format for each type of said output terminals and each screen to be displayed on said output terminals, said display format including said identification information,
   d) selecting a display format based on said specified output terminal and said identification information,
   e) inserting said output information into said selected display format according to said identification information, and
   f) sending said selected display format provided with said output information to said specified output terminal.

5. The program storage medium as claimed in claim 4, wherein said step a) is implemented by recognizing said output terminal in response to an access from said output terminal.

6. The program storage medium as claimed in claim 4, wherein, in said step b), said identification information is defined according to a character string supplied from an external environment.

7. An information processing device whereto a plurality of output terminals are connected, said device comprising:
   application programs operated in said device;
   a virtual terminal object interface provided with data related to a specified output terminal of said output terminals, output information to be output at said output terminals, identification information corresponding to said output information, and least one display format for each type of said output terminals and each screen to be displayed on said output terminals, said display format including said identification information, wherein said data related to said specified output terminal and said identification information are used for selecting a display format; and
   a driver provided for each one of said output terminals, wherein, in the driver for said specified output terminal, said output information is inserted into said selected display format according to said identification information, and said selected display format provided with said output information is sent to said specified output terminal.

8. The information processing device as claimed in claim 7, wherein said output terminal is recognized in response to an access from said output terminal.

9. The information processing device as claimed in claim 7, wherein said identification information is defined according to a character string supplied from an external environment.

10. An information processing method to be carried out on an information processing device provided with a plurality of application programs and whereto a plurality of output terminals are connected, said method comprising:

specifying an output terminal from said output terminals;

defining output information to be output at said specified output terminal and identification information corresponding to said output information;

preparing at least one display format for each type of said output terminals and each screen to be displayed on said output terminals, said display format including said identification information to facilitate application program development;

selecting a display format based on said specified output terminal and said identification information;

inserting said output information into said selected display format according to said identification information; and sending said selected display format provided with said output information to said specified output terminal to permit a user of said specified output terminal to continue writing an application program without rewriting portions of the application program.

* * * * *